W. E. CAREY.
GEARING FOR SAWMILLS.
APPLICATION FILED MAR. 27, 1909.
964,750.
Patented July 19, 1910.
2 SHEETS—SHEET 1.
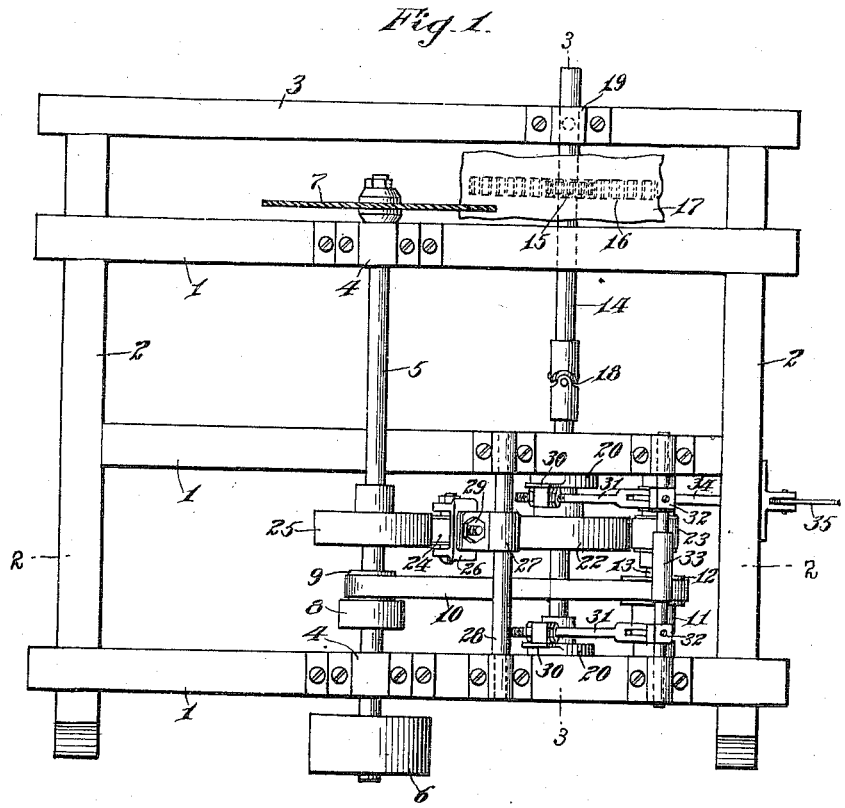
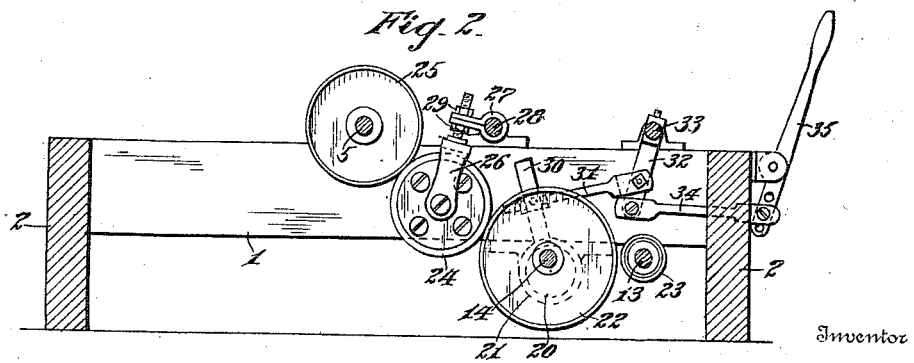
Witnesses
Theo. Rosemund.
J. T. L. Mulhall.
Inventor
William E. Carey,
By Joshua R. H. Potts.
Attorney

W. E. CAREY.
GEARING FOR SAWMILLS.
APPLICATION FILED MAR. 27, 1909.

964,750.

Patented July 19, 1910.

2 SHEETS—SHEET 2.

Witnesses

Inventor
William E. Carey,
By Joshua R. H. Potts
Attorney

UNITED STATES PATENT OFFICE.

WILLIAM E. CAREY, OF CAMBRIDGE, MARYLAND.

GEARING FOR SAWMILLS.

964,750.  Specification of Letters Patent.   Patented July 19, 1910.

Application filed March 27, 1909. Serial No. 486,106.

*To all whom it may concern:*

Be it known that I, WILLIAM E. CAREY, a citizen of the United States, residing at Cambridge, in the county of Dorchester and State of Maryland, have invented certain new and useful Improvements in Gearing for Sawmills, of which the following is a specification.

My invention relates to improvements in saw mills, and more particularly to an improved gearing for saw mills, and improved means for mounting and operating a shifting friction pulley, whereby the pulley is moved in a straight line to engage either of two friction wheels driven in opposite directions, so as to regulate the direction of movement of the table.

A further object is to provide an improved table operating shaft having a universal joint between its ends, an eccentric mounting for said shafts, together with a friction pulley on said shaft, and improved means for simultaneously turning said eccentric mountings, so as to move the shaft on which the friction pulley is secured in a horizontal line without pivotal movement.

With these and other objects in view, the invention consists in certain novel features of construction, and combinations and arrangements of parts as will be more fully hereinafter described and pointed out in the claims.

Figure 3:
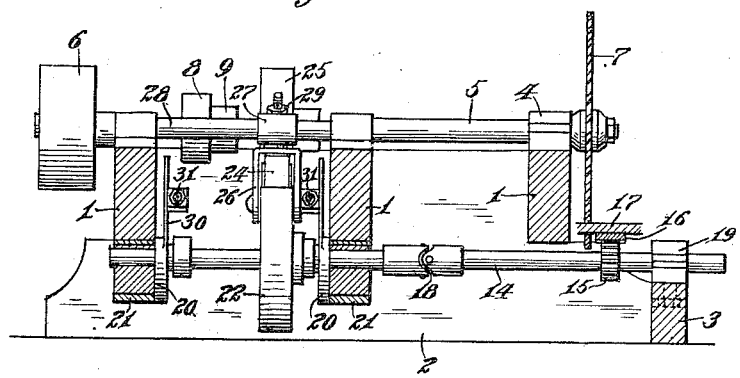
Figure 4:
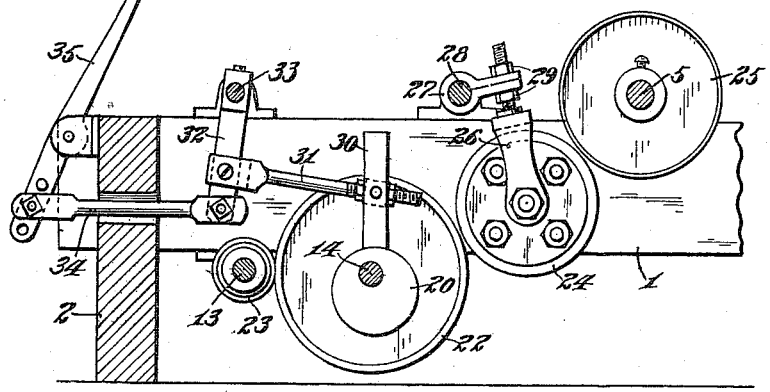
Figure 5:
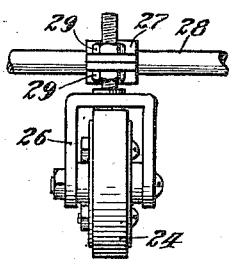

In the accompanying drawings, Figure 1, is a plan view illustrating my improvements. Fig. 2, is a view in longitudinal section on the line 2—2 of Fig. 1. Fig. 3, is a view in cross section on the line 3—3 of Fig. 1. Figs. 4 and 5, are views illustrating details of construction.

1 represents the longitudinal bars of the frame, secured to the upper portion of parallel cross bars 2, and 3 is a longitudinal bar secured to one end of the cross bars 2.

To the longitudinal bars 1, bearings 4 are secured and support a driving shaft 5 on which a driving pulley 6 is secured to receive power from any desired source. This shaft 5 is adapted to revolve the saw 7 secured upon its end as clearly shown, and pulleys 8 and 9 of different diameters are fixed to the shaft 5, and are adapted to transmit motion by means of a belt 10 to similar pulleys 11 and 12 respectively on a shaft 13, supported in bearings on bars 1.
By means of these pulleys of different diameters, the belt can be shifted, so as to vary the speed transmitted from one shaft to the other, as will be readily understood.

14 represents the table operating shaft having a pinion 15 thereon, meshing with a rack 16 on a table 17, the latter being shown fragmentary in Fig. 1. The shaft 14 is made in two sections connected by a universal joint 18, and at one end is mounted in a pivoted bearing 19 on bar 3. The other or inner section of shaft 14 is eccentrically mounted in disks 20, the latter mounted in bearings 21 secured to bars 1. A pulley 22 is fixed to shaft 14, and is adapted to be moved, as will be hereinafter explained, into frictional engagement with a small pulley 23 on shaft 13, or into frictional engagement with a pulley 24, transmitting motion from a pulley 25 on shaft 5.

The pulley 24 is mounted in a fork 26, the latter is adjustably secured in a split clamping collar 27 on a cross rod 28. This fork is adjustably secured by means of nuts 29, which enable the pulley to be moved up and down and regulate the frictional contact, which is a desirable feature, as the face of the pulley 24 becomes worn, and the movement of pulley 22 is necessarily more or less limited, and by adjusting pulley 24 the proper contact can be had.

Upwardly projecting arms 30 are secured to disks 20, and are pivotally connected by links 31 with crank arms 32 on a shaft 33. One of these crank arms 32 is connected by a link 34 with a lever 35, which latter is to be manually operated, as will now be explained.

When the upper end of lever 35 is forced outwardly, the eccentrically mounted shaft 14 will be moved to the left as in Fig. 2, and will firmly engage pulley 24 and force the same into tight engagement with pulley 25, thus transmitting motion from pulley 25 to shaft 14 to drive the table 17 in one direction. When the lever 35 is moved inwardly, the shaft 14 will be moved to the right by reference to Fig. 2, and to the left by reference to Fig. 4, so as to press the pulley 22 into tight engagement with pulley 23, and hence motion will be transmitted from shaft 5 to shaft 13 through the medium of belt 10, and directly from shaft 13 to shaft 14 to drive the table 17 in an opposite direction to that above described. When the lever is moved to an intermediate position, the pulley 22 will not frictionally engage either of the pulleys 23 or 24, and hence the shaft 14 and table 17 will stop.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In an apparatus of the character described, the combination with a frame, bearings on the frame, and disks mounted to turn in said bearings, of a shaft comprising two sections, a universal joint connecting the sections, a pivoted bearing supporting one end of one section, the other section eccentrically mounted in said disks, a friction pulley on said shaft, friction pulleys in line with the periphery of said first mentioned pulley and on opposite sides thereof, and means for turning said disks to move the shaft and position the first mentioned pulley into frictional engagement with either of said last mentioned pulleys.

2. In an apparatus of the character described, the combination with a frame, a driving shaft on the frame, a driven shaft on the frame, friction pulleys on said shafts, a countershaft driven by said driving shaft, a friction pulley on said countershaft, a friction pulley between the pulleys on the driving and driven shafts, a rod supported on the frame, a fork supporting said last mentioned pulley, a split collar on the rod, and nuts on said fork, whereby said friction pulley can be adjusted to compensate for wear.

In testimony whereof I have signed my name to this specification in the presence of two subscribing witnesses.

WILLIAM E. CAREY.

Witnesses:
  JOHN B. NABB,
  W. S. HODDINOTT.